(12) United States Patent
Harris et al.

(10) Patent No.: US 7,792,859 B2
(45) Date of Patent: Sep. 7, 2010

(54) MEDIA/DATA CARD

(75) Inventors: Brock M. Harris, Arlington, VA (US);
Sean M. Bodmer, Haymarket, VA (US)

(73) Assignee: HB Media, LLC, Arlington, VA (US)

( * ) Notice: Subject to any disclaimer, the term of this patent is extended or adjusted under 35 U.S.C. 154(b) by 0 days.

(21) Appl. No.: 12/458,361

(22) Filed: Jul. 9, 2009

(65) Prior Publication Data
US 2009/0276434 A1 Nov. 5, 2009

Related U.S. Application Data

(63) Continuation-in-part of application No. 11/509,624, filed on Aug. 25, 2006, now abandoned.

(60) Provisional application No. 60/725,287, filed on Oct. 12, 2005.

(51) Int. Cl.
*G06F 17/30* (2006.01)
*G06F 17/00* (2006.01)

(52) U.S. Cl. .......... 707/781; 705/57; 707/694; 713/166

(58) Field of Classification Search .......... None
See application file for complete search history.

(56) References Cited

U.S. PATENT DOCUMENTS

| | | | |
|---|---|---|---|
| 5,170,046 A | 12/1992 | Kusakabe | |
| 5,761,655 A * | 6/1998 | Hoffman | 707/4 |
| 6,145,046 A | 11/2000 | Jones | |
| 6,345,279 B1 | 2/2002 | Li et al. | |
| 6,385,677 B1 | 5/2002 | Yao | |
| 6,501,163 B1 | 12/2002 | Utsumi | |
| 6,779,059 B2 | 8/2004 | Han et al. | |
| 6,829,672 B1 | 12/2004 | Deng et al. | |
| 6,832,281 B2 | 12/2004 | Jones et al. | |
| 6,862,604 B1 * | 3/2005 | Spencer et al. | 707/205 |
| 6,871,244 B1 | 3/2005 | Cahill et al. | |
| 2002/0095538 A1 | 7/2002 | Marshall | |
| 2002/0099668 A1 * | 7/2002 | Perlman | 705/76 |
| 2004/0054827 A1 | 3/2004 | Liu et al. | |
| 2004/0224638 A1 | 11/2004 | Fadell et al. | |
| 2004/0267988 A1 | 12/2004 | Zhang | |
| 2005/0021895 A1 | 1/2005 | Son et al. | |
| 2005/0097440 A1 * | 5/2005 | Lusk et al. | 715/500.1 |
| 2005/0169467 A1 * | 8/2005 | Risan et al. | 380/201 |

FOREIGN PATENT DOCUMENTS

DE 101 41 873 A1 3/2003
FR 2 853 975 A1 10/2004

* cited by examiner

*Primary Examiner*—Greta L Robinson
*Assistant Examiner*—James J Wilcox
(74) *Attorney, Agent, or Firm*—Richard C. Litman (57) ABSTRACT

The media/data card is a computer readable medium for storing data files, and in particular, media files. The device may be a flash media memory card or other conveniently sized, portable storage device. The media/data card stores a data structure for controlling access to data files stored on the computer readable medium. The data structure includes a media storage substructure for storing the data files, a file system directory substructure containing the locations of the data files stored in the media storage substructure; and a security substructure for describing allowed access to the data files stored in the media storage substructure. The data files may be multimedia files, such as compressed audio or video files. The data files may be encrypted to provide enhanced security.

13 Claims, 9 Drawing Sheets

MEDIA/DATA CARD

CROSS-REFERENCE TO RELATED APPLICATION

This application is a continuation-in-part of U.S. patent application Ser. No. 11/509,624, filed Aug. 25, 2006, now abandoned which claimed the benefit of U.S. Provisional Patent Application Ser. No. 60/725,287, filed Oct. 12, 2005.

BACKGROUND OF THE INVENTION

1. Field of the Invention

The present invention relates to storage and distribution of audio and video media files, and particularly to a media/data card that provides for the storage and distribution of collections of media files on a universal digital storage device, which permits playback of the media files on diverse devices and provides security against unauthorized copying.

2. Description of the Related Art

Many people enjoy listening to music or watching movies and videos on a wide variety of portable devices. At one time portable devices simply played the content distributed in the same formats provided for non-portable devices, but the development and popularization of audio and video compression has allowed media to be converted to files of comparatively small sizes, and portable player devices that store and play compressed files have become popular with consumers.

The use of compression technology has provided a number of benefits, and consumers have fervently embraced these advantages. Consumers have become accustomed to being able to carry large collections of music and other entertainment media in a small portable device. Consumers also value the ability to move their digital files from one portable player to another because this allows them to enjoy their music collections in various settings. Consumers expect to be able to experience their music or other media in their automobiles, for example, while working out at the gymnasium, or in any other setting without having to purchase new copies of the media.

Compressed media formats also enable consumers to compose collections of exactly the material they desire by copying and compressing audio tracks from prepackaged media collections, such as collections distributed on Compact Disc (CD) or a Digital Versatile Disk (DVD), or by purchasing individual compressed media tracks from online vendors. Consumers are motivated to create these collections because the prepackaged collections contain some tracks that are perceived as being less enjoyable "filler" material that the consumer would not have purchased if the enjoyable tracks were separately available.

However, the popularity of these compressed formats has generated some very real problems for the copyright owners of the media. The copyright owners have invested money in the creation of the media and would like to profit from the distribution and use of the copyright protected material. Copyright holders and authorized distributors of music would prefer that consumers purchase songs as collections because this business model allows them to optimize their revenue stream. Copyright holders would further like control over the playback devices in which media are stored because without such control the small size of compressed digital files makes them easy to distribute or redistribute using the file-sharing capabilities of the playback devices. The media files stored on playback devices can even be uploaded to the Internet, where they can be distributed to unauthorized consumers without providing any revenue to the copyright holders.

Consumers have also encountered some additional obstacles in satisfying their desires for entertainment media. While they can search for individual music tracks, videos, and movies on the Internet, this search can be time consuming, and even when a desired media file is located, the file is often of questionable quality, resulting in possible diminished enjoyment of a listening or viewing experience. Consumers who download files without the authorization of the copyright holders are also increasingly at risk of being sued for copyright infringement, a risk that makes seemingly "free" content unattractive. Other consumers avoid the unauthorized download of content from the Internet because of their desire to avoid involvement in illegal activity.

Consumers also find the process of copying music tracks and compressing tracks from CD and DVD sources problematic. The process can be time consuming unless performed on powerful computers. Increasingly, distributors of CDs are including protection mechanisms to prevent the copying of media from CDs. Essentially, all media distributed on DVD is provided with copy protection. While means to circumvent copy protection is often available, the use of such means is illegal in many countries, including the United States.

Copyright owners want to make their media more attractive to consumers by accommodating the uses consumers enjoy because doing so increases a consumer's desire and demand for entertainment media. However, copyright owners would also like to avoid enabling copying and file-sharing practices that circumvent their ability to generate revenue from their product.

Memory devices for data and multimedia storage are available, but are usually customized to particular devices, and do not provide measures for protecting the copyright interests in media recorded on the storage device. An exemplary device is described in German Patent No. 10,141,873, published on Mar. 20, 2003, which discloses an adapter for interfacing flash memory cards to a computer, but does not disclose an access control system for limiting access to data stored on the flash memory cards.

Another exemplary device is shown in French Patent No. 2,853,975, published on Oct. 22, 2004, which describes an adapter for interfacing memory cards of varying technologies, including flash memory and microdrives, to a personal computer for transferring the files to the computer, but does not describe an access control mechanism for allowing copyright holders to limit access to files.

Thus, a method of distribution media files on a digital media/data card solving the aforementioned problems is desired.

SUMMARY OF THE INVENTION

The media/data card (also referred to herein as a "media card" or "data card") is a computer-readable memory device for storing data files, and in particular, media files. The device may be a flash media memory card or other conveniently sized portable storage device. Stored on the media/data card is a data structure for controlling access to data files stored on the computer readable memory. The data structure includes a media storage substructure for storing a plurality of data files, a file system directory substructure, which contains a list of locations of the data files stored in the media storage substructure, and a security substructure for describing allowed access to the data files stored in the media storage substructure.

The data structure may further include a media description substructure containing a description of the data files stored on the flash card or other storage device. The data files may be multimedia files, such as compressed audio files or compressed video files. The data files may be encrypted, or directory information necessary to access the files may be encrypted, so that attempts to circumvent the access control methods implemented by the invention are prevented.

Access to the data files is controlled by security information stored on the media/data card. The security information includes identification of the authorized user of the data card, and may also include information describing the levels of access allowed for authorized and unauthorized users. Specialized software is used to access the files. The special software obtains user-identification information, compares the information to the security information on the card, and only allows access that a content owner authorizes for the data on the media/data card.

The media card may also store software allowing media files to be played on a diverse set of playback devices, including cell phones, personal data assistants (PDA), and desktop or laptop computers, sometimes referred to herein as "portable computing devices."

Software is provided for accessing media files on the media/data card. The software contains instructions that, when loaded on a computer, provide secure access to the media files. Under control of the software, the computer reads a security data structure on the media/data card, retrieves an identifier associated with a user requesting access to the media files, and compares the user identification stored in the area with the user identifier. If the user identifiers match, the user is identified as the authorized owner of the card, and the computer allows the user to access the data files as allowed by the content provider.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to the distribution of collections of media or multimedia files to consumers for playback on diverse media playback devices. The invention relates both to a media/data card and to a system and method that uses digital storage devices of a convenient size, such as credit card size, to store compressed, digitally stored media files for distribution of the files to consumers. The digital storage devices support mechanisms for providing copyright protection, allowing the media files to be played back or copied only as authorized by the copyright holder.

Figure 1:
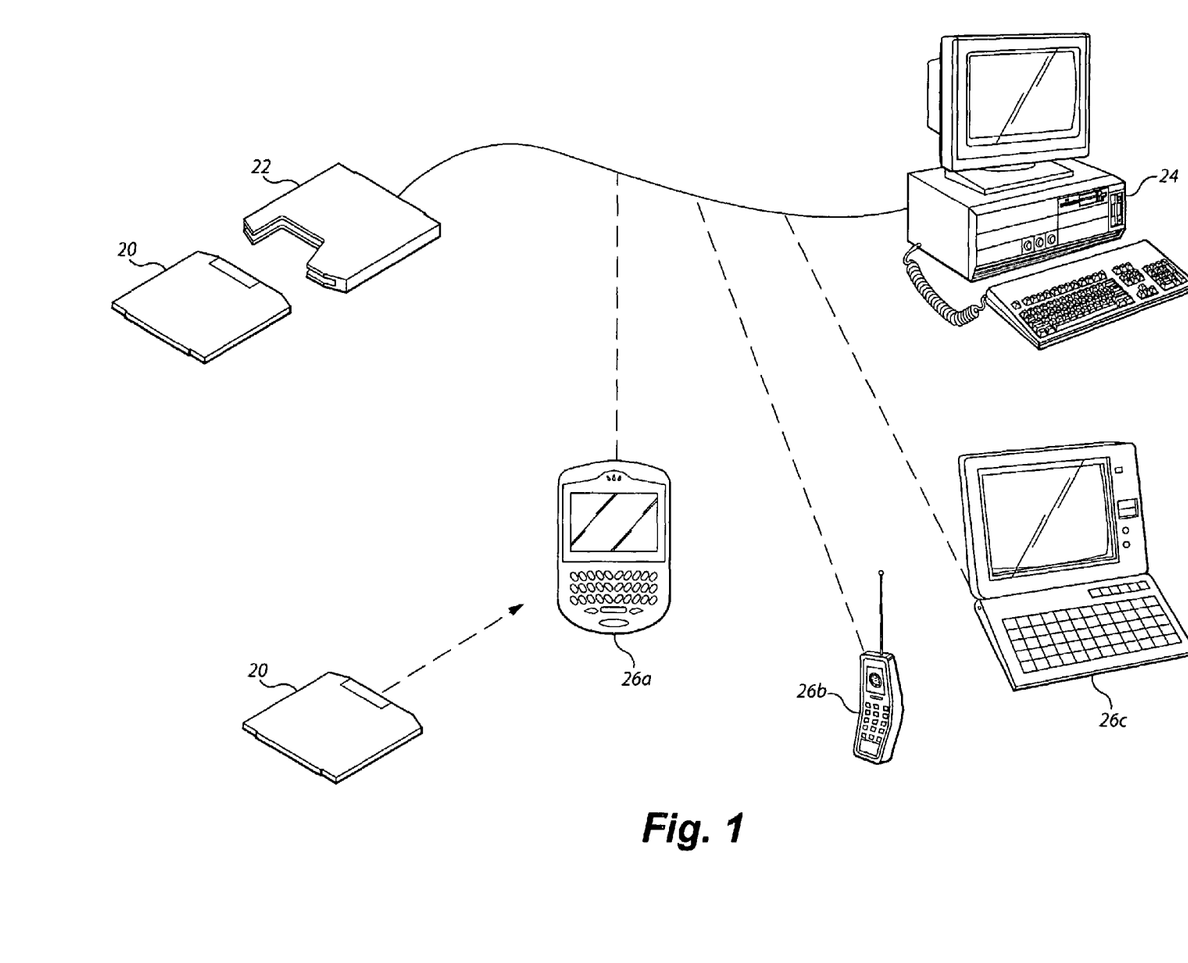
FIG. 1 is a block diagram showing methods of using a media/data card according to the present invention with various playback devices.

FIG. 1 depicts an environment in which consumers may utilize the media/data card for playback of digital media files. A media/data card 20 is provided. The media/data card 20 stores a collection of digital media files. Preferably these files are stored in a compressed format to maximize the content storable on the digital storage device. The media/data card 20 is inserted into an adapter 22. The adapter 22 is designed to read the data on the media/data card 20 and to convert the data to a format and protocol supported by a computer 24. For example, the computer 24 may support the Universal Serial Bus (USB) protocol. The adapter 22 reads the media/data card through a reader supported by the media/data card 20, and converts the media/data card protocol to the USB protocol supported by the computer. Other protocols, such as IEEE 1394, could be used in place of the USB protocol in accordance with the invention. Storage medium 20 may store and desired type of computer readable data, not limited to the exemplary media files discussed above.

Using specialized software, described below, installed on the computer 24, a user may upload the media files from the media/data card 20 and store them on the computer's hard drive or other storage medium associated with the computer 24. After uploading to the media files to the computer 24, software on the computer can be used to organize the collection of media and to playback the files using audio and video facilities included with the computer 24. Playback devices can be connected to the adapter 22 via the Universal Serial Bus (USB) connection 28, or through any other suitable interface.

The media playback devices are provided with software compatible with the particular playback device. The system executes on the playback device to render playback of the digital media file using the sound and visual display facilities of the playback device. The system executes the playback engine, which is a module of the system that reads the digital media files and executes them on the end device. Among the devices that may be used as playback devices are cell phones 26b, personal digital assistants (PDAs) 26a, laptop computers 26c, exercise equipment, automotive electronics, personal electronics, gaming consoles, home entertainment systems, or more generally, any portable computing device, which also encompasses MP3 players, mini or portable DVD players, or any other portable device that has a processor or microprocessor, a data communications port for connection to the digital media/data card, and audio or visual transducers for playback of the digital files stored on the digital media/data card under direction of the processor. When writing digital media to the card, the system reads each file and may activate a security feature that protects digital content from being copied from the device by a party who is not the original purchaser of the device or who has an authorized machine on which the digital content can be edited. Upon being activated or implemented on the card by the systems loaded in the playback device's active memory module, the computer 24 may control or limit the ability of users to play back files or to upload files to the playback devices 26 or to the computer 24.

Alternatively, the playback devices may be designed to directly interface with the digital media/data card without the need for the adapter 22 or the USB connector 28 (as indicated by the dashed interface arrow of FIG. 1).

Figure 2:
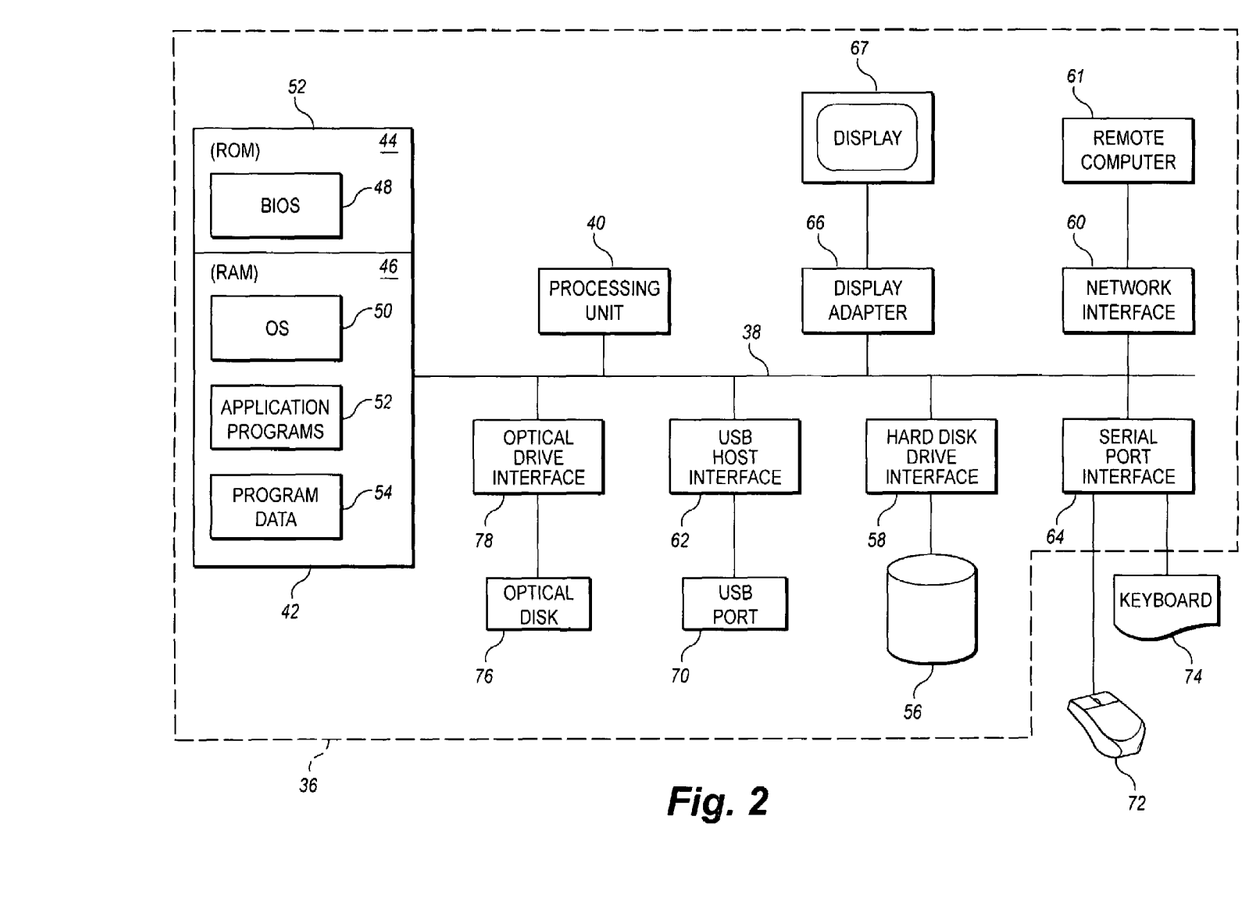
FIG. 2 is a block diagram of an exemplary computer system on which a media/data card of the present invention may be used.

FIG. 2 illustrates an exemplary computer system 36 that may interface with the digital media/data card 22. The computer system 36 includes a system bus 38 that interconnects various elements comprising the computer 36. The computer elements include processor subsystem 40, a system memory 42, and a number of interface and adapter systems supporting the connection of internal and external devices to the computer 36.

The system bus 38 may comprise a number of bus subsystems. For example, a PCI bus, an ISA bus, and an AGP connection system may be provided. The system bus provides the means for moving data between the various components of the personal computer 36.

The processor subsystem 40 comprises one or more Central Processing Units (CPUs). The processor subsystem directs the overall operation of the computer by retrieving and executing logical and arithmetic instructions and issuing commands to control other computer components.

The system memory 42 may comprise read only memory (ROM) 44 and random access memory (RAM) 46 components. The ROM 44 includes the basic input/output system (BIOS) 48. The BIOS 48 includes routines that are performed to initialize the computer during startup and to conduct low-level operations between system components.

The RAM 46 may store the operating system (OS) 50, and may store instructions and data for executing application programs in the application program 52 and program data 54 areas. The information stored in the RAM 46 may be loaded from a non-volatile storage area, such as ROM 44 or a hard drive 56, during startup of the system or upon initiation of an application program.

Additional elements connected to the system bus 38 may include a display adapter 66, a network interface 60, a USB host interface 62, a hard disk drive 58 interface, and a serial port interface 64.

The display adapter 66 provides an interface for connecting an external monitor 67 to the computer. The network interface 60 provides a network connection capability for communicating to remote devices through a local area network (LAN), an intranet, an extranet, or the Internet. The USB host interface 62 is connected to the system bus 38 and provides an interface to a USB port 70. The USB port 70 may supply electrical power and a data path for one or more USB compatible peripherals. One or more hard drives 56 may be connected to the computer 36 through the hard disk drive interface 58. The hard drive 56 provides non-volatile storage and may store the operating system, application programs, and program data.

Input devices for accepting data input from users, such as a mouse 72, keyboard 74, or trackball (not shown) may be interfaced to the system bus 38 via the serial interface 64. Alternatively, a USB compatible keyboard, mouse, or other input device may be connected to the computer via the USB port 70.

Additional devices, such as an optical disk drive 76 for reading from or writing to a removable optical disk, such as a CD-ROM, CD-R, DVD-ROM or other optical media, may be connected to the computer 36 through an appropriate controller or interface card 78.

Those skilled in the art should appreciate that the list of components given above is not an exhaustive one and that other types of devices can be interfaced to the computer using the interfaces described above or through the use of additional or suitable alternative interfaces and controllers connected to the system bus 38. Further, exemplary computer system 36 may be any suitable computer system, including a computer terminal connected to an external computer network, comprising at least one remote computer 61, in communication with computer 36 via network interface 60.

Figure 3:
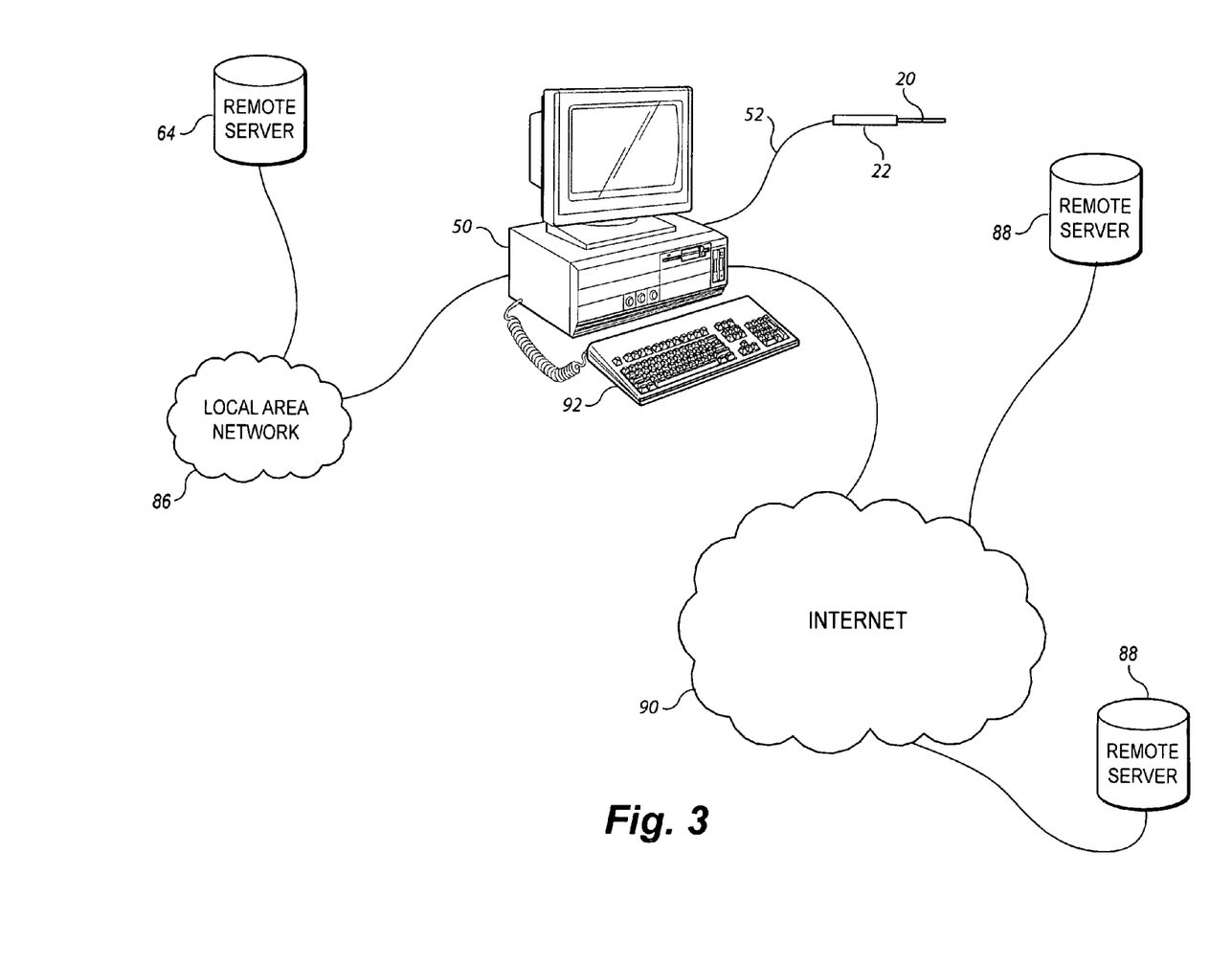
FIG. 3 is a block diagram of a networked embodiment of a system on which media files may be written to a media/data card.

FIG. 3 illustrates a network environment for placing media files on the media/data card 20. A media card adapter 22 is connected to a computer 80 using a compatible interface, such as a USB or IEEE 1394 cable 82. A local server 84 may be provided. The local server 84 may be connected to a local area network 86, which, in turn, is connected to the computer 80 via a network interface installed in the computer 80. One or more remote servers 88 may be connected via the Internet 90. The computer 80 may be connected to the Internet 90 through a second network interface installed in the computer 80.

Using specialized software installed on the computer 80, one or more media collections of media files are identified. The identification of the media files may be made through operator input using a keyboard 92 or other input device connected to the computer 80. Alternatively, the identification of the media collection can be preprogrammed into the computer 80, or the computer 80 can be programmed to select a collection of media files automatically.

Next, the computer locates and retrieves the media files comprising the identified collection. The files may reside on the hard drive or an optical storage disk attached directly to the computer 80. Alternatively, the media data files may be stored on the local server 84 and retrieved via the connection to the local area network 86, or the files may be retrieved from one or more remote servers 88 over the Internet 90. A collection may include files stored on combinations of internal storage, local server storage, and one or more remote servers in accordance with the invention.

Figure 8:
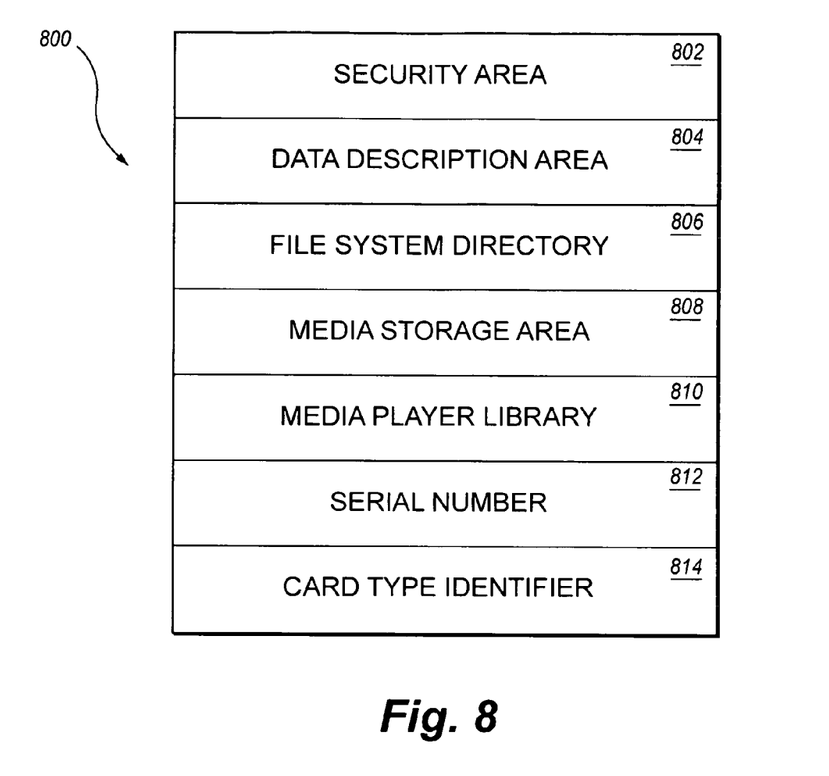
FIG. 8 is a chart showing the data structures on a media/data card according to the present invention.

After the files making up the collection are identified, the system of the media/data card 20 can be prepared by writing the digital media data structures to the storage element of the media/data card 20. FIG. 8 illustrates representative substructures comprising the digital media card data structure 800 that may be contained on the media/data card 20 in accordance with the invention. The identified digital media data files are retrieved from the protected storage location in which they reside and are written to the media storage substructure 808 of the card 20. This is similar to "whole disk encryption", where the system implements system security measures to protect itself from exploitation of desired security measures. The process of writing the media data files to the media card data structure 800 may include encrypting the files before storing them in the media card data structure 800. The files may be stored as individual files or concatenated into one large file in order to obfuscate the location or true file type identification.

The file system directory substructure 806 contains information for describing the name and location of the media files written to the media card data structure 800. The information contained in the file system directory substructure 806 is used to locate the files on the card during reading and playback operations. The file system directory substructure 806 can be a conventional file directory system, such as Microsoft's FAT or VFAT directory system. Portions of the file system directory substructure 806 may be encrypted as a security measure against unauthorized copying.

Figure 9:
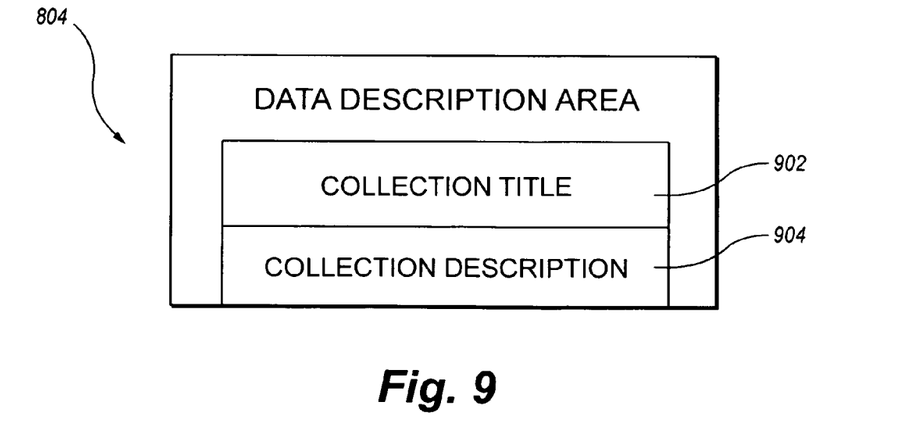
FIG. 9 is a block diagram of a data description data structure stored on a media/data card according to the present invention.

The media storage substructure 808 may comprise a data description substructure 804. The data description substructure 804 is shown in greater detail in FIG. 9. The data description substructure 804 comprises data describing the collection of media files contained on the media/data card 20. The elements of the data description substructure 804 may comprise a media collection title 902 and a collection description element 904 describing the collection and/or the individual files making up the collection. The collection description element 904 may comprise such information as: the author of the collection; the names and order of play for the individual media files; copyright information concerning the collection or the files comprising the collection; the types of the media file, such as audio, video, MP3, or MP4; etc.

The data media storage substructure 808 may further include a security substructure 802. The security substructure 802 contains information used to limit copying and playback of files to authorized users. The security substructure contains security information that can be correlated to an authorized user of the card. Software used to access media files stored in the media card data structure 808 accesses the security substructure 802 when a request to access the media/data card 20 is received, and uses the security information to determine whether the request for access can be granted.

The security information may comprise information correlated with a unique user identifier obtained from the authorized user of the card. This information may be written to the media/data card 20 at various times, including the time of manufacture of the card 20, at the time of purchase, or during the first attempt to access the card by a user.

The user identifier may be obtained from a variety of sources. The unique identifier may be derived from biometric data associated with a user or purchaser. The identifier may be assigned to the user at the time of purchase using personal data of the user. The identifier may alternatively be assigned by a vendor or other authorized agent using an online registration process prior to the first access of media files on the media/data card 20. The identifier may also be obtained from a user's computer or player used to access the media/data card 20 for the first time.

An identifier obtained from a user's computer may be derived from unique identifiers associated with hardware installed on the user's computer, such as the MAC address of a network interface card or the serial number of a hard drive, a number assigned during a registration process, information derived from user information entered by a computer user, biometric information obtained from the user, or any other method which allows the assignment of unique identifiers. The user identifier may be written to the security substructure 802.

The user identifier may be encrypted using any well known and secure algorithm known in the art. By way of example, the encryption algorithm may be Blowfish, DES, or CAST-128 (described in RFC 2144). Alternatively, a digital signature of the user identifier may be written to the card. The digital signature may be computed using a cryptographically secure hashing function to transform the user identifier into a digest value. Algorithms known in the art, such as MD4, MD5, or SHA (Secure Hash Algorithm), are examples of suitable algorithms. Prior to computing the digital signature, the user identifier may be combined with identifying information obtained from the media/data card 20, such as the serial number 812 of the card, a checksum of the data stored on the media/data card 20, or other suitable identifying information.

In some instances, such as during preparation of media collections for mass distribution, the user identifier will not be available at the time of setting up of the media/data card 20. In that case, a default identifier may be used in place of the user identifier when preparing the media/data card 20. Software used to access the media/data card 20 can detect the use of the default identifier as an indication that the media/data card 20 is being accessed for the first time. Alternatively, the security substructure 802 can include a flag value indicating that the media/data card 20 is being accessed for the first time and that the user identifier should be initialized.

The security substructure 802 of the media/data card 20 may further comprise information describing the allowed access methods for authorized and unauthorized users of the media/data card 20. The access levels may indicate whether a user may playback or copy media files from the media/data card 20. Software assigned with the card may allow users identified as authorized users to playback files and to copy them to a controlled environment, while unauthorized users are only allowed to playback the files. In an alternative embodiment, access permissions for each class of user are described in the security substructure 802. For example, a copyright holder may indicate that a particular collection of media files may be played back only by the authorized user of a card, and that no copying of media files from the collection is allowed. Alternatively, a copyright holder may use the security substructure 802 to indicate that all users may copy and playback files from the collection without restriction. The access control information may be encrypted or protected with digital signature techniques to prevent tampering.

The media card data structure 800 may further comprise a digital media player library substructure 810. The digital media player library 810 includes a plurality of modules for playing digital media on various digital media players. The digital media player library may have modules catalogued for each of the supported digital media players and digital media file types. The modules may be written in any suitable programming language. Preferably, the modules are written in a cross-platform language, such as Java, C# (C sharp), or any proprietary portable device language. The use of a cross-platform language allows common features of the system libraries for various players to be shared, thus minimizing the programming effort required to support new digital playback devices and conserving the required space on the media/data card 20 for storing digital media files. The system will read each file using an intermediate filter driver that will leverage internal codec for each file type and stream the file through the system to the end device without the need to perform any file conversion functions on any digital media file in order to read or play back the digital content. The intermediate filter driver module within the system will also recognize the type of digital media and end device and implement the device initialization system that manages the playback of all digital media files.

The media card data structure 800 may further comprise a serial number substructure 812 and a card type identifier substructure 814. The serial number substructure 812 holds a unique serial number assigned to the media/data card 20. The card type identifier substructure 814 contains data identifying the storage card as a media data card compatible with the system and may further include version information correlated to the particular format used for the media card data structure 800. The version information may be used by system routines to select the algorithms used to access a particular version of the media/data card 20.

The substructures of media card data structure 800 need not be stored in a contiguous area of memory. The location of such areas as the security substructure 802, the serial number substructure 812, and other substructures of the media card data structure 800 may be disguised as an anti-tampering measure.

The media/data card 20 may be used with various devices to access media files on the media/data card 20, allowing a user to transfer the files to a computer and to playback the files. The access to the files may be limited to levels of access specified by the copyright holder or his authorized agent.

Specialized software is installed on the computer 24. The software comprises computer instructions, which, when executed, direct the computer 24 to carry out the processes illustrated in FIGS. 5, 6, and 7.

Access to the media/data card 20 is provided by inserting the card 20 into an adapter 22 connected to the computer 24. A user interacts with the computer 24 using input devices, such as a mouse 72 or a keyboard 74, to request access to the files on the media/data card 20.

Figure 6:
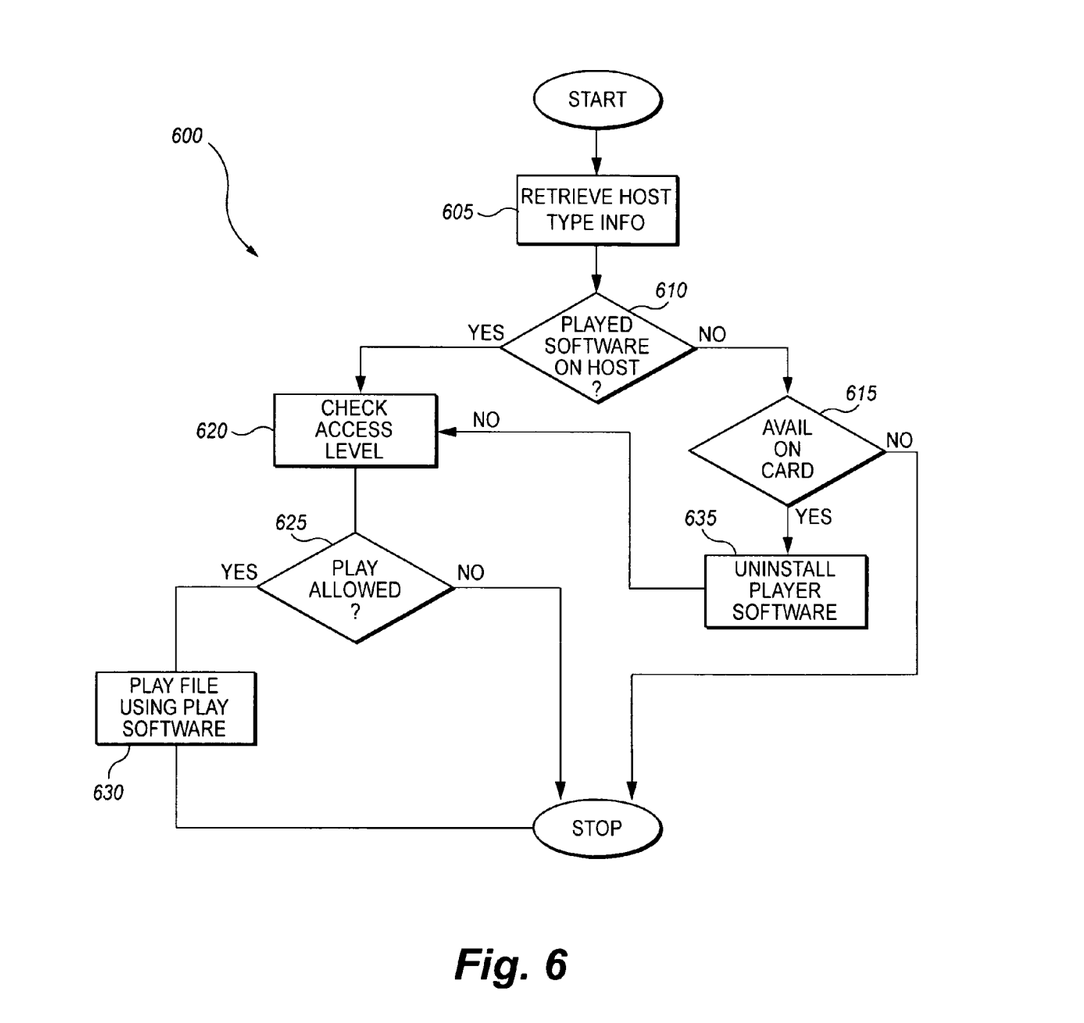
FIG. 6 is a flowchart depicting a playback process for playing files stored on a media/data card of the present invention on a playback device.

The user may elect to play one or more of the media files on the computer. FIG. 6 describes the playback process carried out by the computer 24 to service a request to play media files.

Starting at step 605, the computer 36 retrieves host information describing the type of hardware and the operating system installed on the computer 36. The computer 36 then determines if appropriate digital player for the digital media files is contained on the computer 36 at step 610. Step 610 may comprise reading the media description substructure 804 to determine the types of digital media files present on the card 20, and searching through an index or registry maintained on the computer 36 to determine whether the necessary player software for the media files is present on the computer 36.

If the required digital player system is not available, system control is directed to block 615. At this block, a determination is made as to whether required system is available in the digital media player library substructure 810 of the media/data card 20. If the system library is available on the card 20, program control proceeds to step 635 and the required media player library modules appropriate for the operating system and computer 36 are retrieved from the media/data card 20 and installed on the computer 36.

If appropriate digital player modules are not available on the card 20, program control exits the digital media player routine. Alternatively, the user may be directed to alternative sources for providing the appropriate digital media system, such as a system installed on computer readable media, such as an optical disk or floppy disk, or to an Internet site to download appropriate software. The media data card system does not require a specific digital player on the end device and will utilize its device initialization system in order to access the default digital media player already present on the end device.

When appropriate digital media software is located and/or installed on the computer 36, program control is transferred to block 620. At this point the program determines the user's authorized access level by carrying out the access determining process 500 illustrated in FIG. 5.

Figure 5:
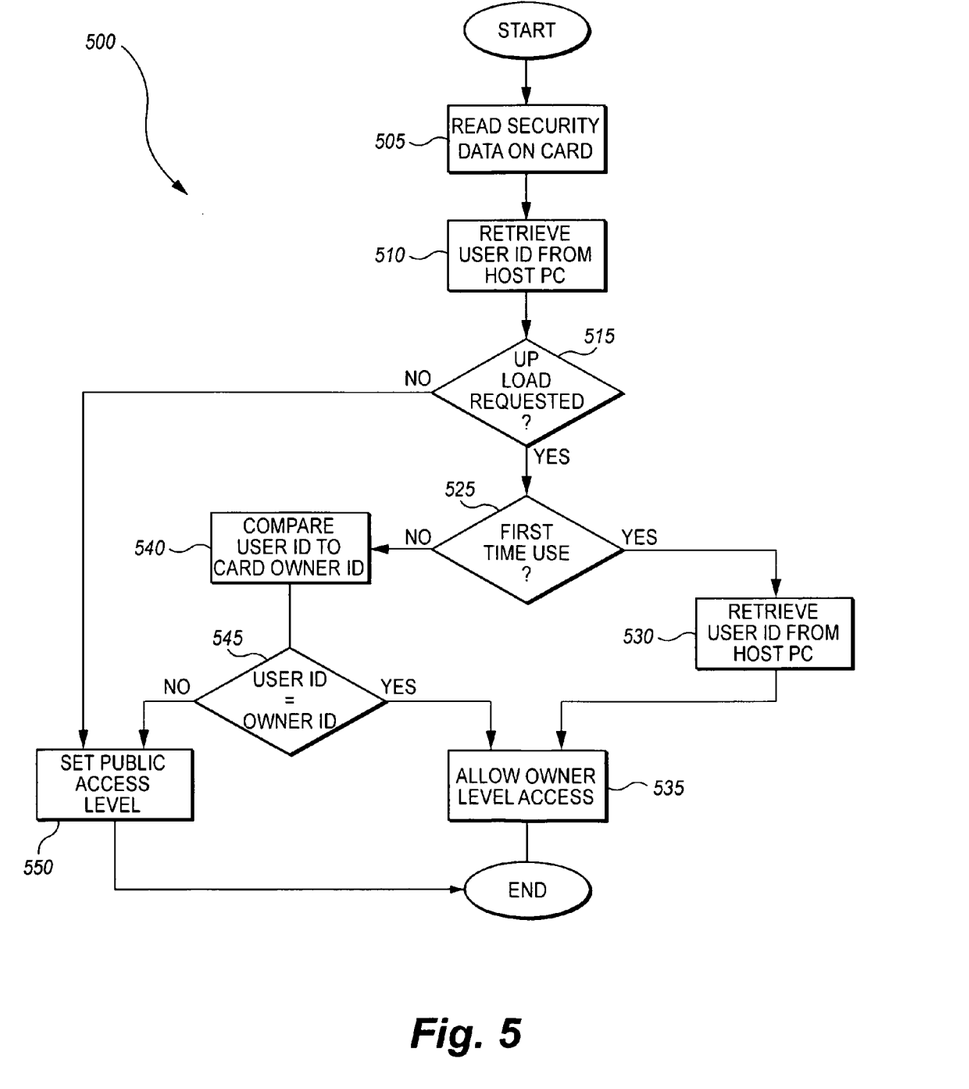
FIG. 5 is a flowchart depicting a process for accessing media files on the media/data card of the present invention.

The process for determining the authorized access level starts at block 505 in which the computer 36 reads the security information from the security substructure 802 of the media/data card 20. Program control then proceeds to block 510, where a unique user identifier associated with the user or the computer 36 is retrieved. This user identifier may be comprised of information derived from any of a variety of sources, including hardware identifiers associated with the computer, such as the MAC address of a network interface card or a serial number associated with a computer hard drive or any value that would be labeled as a unique system identifier. Alternative sources for the user identifier include an identifier generated during the installation and or registration of software installed on the computer, biometric information obtained from the user, or specialized hardware attached to the computer, such as a dongle containing a unique identifier.

Program control then proceeds to block 515 where the user request is categorized. In the preferred embodiment, the request is categorized as either a request to playback files or a request to upload files to a computer.

If the request is determined to be a request to upload files to the computer 36, program control is transferred to block 525. At this point, the security data is examined to determine whether the card is receiving an upload request for the first time. The mechanism for determining whether the request is made for the first time may comprise examining a flag in the security substructure 802 indicating that the card is being accessed for the first time.

Alternatively, the mechanism may involve examining user identification information stored security substructure 802 to determine whether user information has been previously stored in the security area 802. The method used to examine the user information is consistent with the format chosen for the writing to the security substructure 802. Version information read from the card type identifier substructure 814 of the media/data card may be used to indicate the particular algorithms used for the security area 802 so that the application software on the computer 36 may properly handle a variety of implementations for the data structures on the media/data card 20.

The security substructure 802 may comprise a digital signature generated from the user ID combined with the serial number of the media/data card 20. Block 525 may be implemented by retrieving the serial number and a default user identification pattern that indicates first time usage. The digital signature is computed from the combination of the serial number and the default user identification using the appropriate algorithm, and if this computed signature matches the digital signature contained in the security substructure 802, then the card 20 is receiving an upload request for the first time.

When a first upload request is detected, program control is transferred to block 530, where the security substructure 802 is initialized using the user identification information of the user making the request. Initializing the security area 802 identifies the user as the owner of the card so that, during future requests, special features, such as the ability to upload data files to the users PC, can be limited to the card owner. In this way, the distribution of files to unauthorized owners can be prevented. After the card 20 is initialized, control is transferred to block 535.

When it is determined that at block 525 that the upload request is not the first received upload request for the media/data card, program control is transferred to block 540.

At block 540, the computer 36 determines whether the user is the owner of the card by comparing the current user identification with the user identification stored in the security substructure 802 of the media/data card 20. Block 540 may compute a digital signature using the serial number of the card 20 and the user identification information. If the computed signature matches the digital signature contained in the security substructure 802, then the user making the request is identified as the owner of the card 20. Including the computer serial number serves as a check that the media files have not been duplicated by copying them from another media/data card. The algorithm is used to determine that the card 20 is being accessed by the card owner consistent with the method used to author the security substructure 802. Version information read from the card type identifier substructure 814 of the media/data card may be used to indicate the particular algorithms used for the security area 802 so that the application software on the computer 36 may properly handle a variety of implementations for the data structures on the media/data card 20.

After the comparison is made in block 540, control is transferred to block 545. If user is determined to be the owner of the card, control is transferred from block 545 to block 535. Otherwise program control is transferred from block 545 to block 550.

At block 535, the access level is set to the access level appropriate for the owner of the media/data card 20. The access level may be default level set for all owners of a media/data card. For example, all card owners may be allowed to play media files and to transfer them to one designated personal computer. Alternatively, the access permission for a specific media/data card 20 may be specified by the copyright holder or his authorized agent in the security substructure 802 of the media/data card 20 during the process of preparing the card 20 to contain media files.

If the media request is determined not to be an upload request at block 515, or if the user is determined not to be a card owner, the access level may be set to a public access level at block 550. The authorized level of access may be a default level, allowing users to play media files but not to upload them to their computer. Alternatively, the level of access for non-owners may be specified by the copyright holder or his authorized agent in the security substructure 802 of the media/data card 20 during the process of preparing the card 20 to contain media files. For example, for a particular media file collection, the copyright holder may determine that non-owners may neither play the media files nor upload them to their computer.

From either block 550 or block 535, the process described in FIG. 5 exits, returning the access level information to the process calling the routine in process 500.

After the access level is determined, control returns to the playback process of FIG. 6 at block 625. At this point the computer examines the access level to determine whether the user is authorized to play the media files on his computer 36. If playback is allowed, control is transferred to block 630 where the appropriate software modules stored on the computer 36 are invoked to play the media files selected by the user. If playback is not allowed, the playback process is exited and the user is not allowed to play the media files.

From the computer 36, the user may request media files to be uploaded to the computer 36 for storage on the computer hard drive. Using the process illustrated in FIG. 7, the user may upload files to his computer 36 in accordance with access levels specified by the copyright holder for the media files on the media/data card 20.

Figure 7:
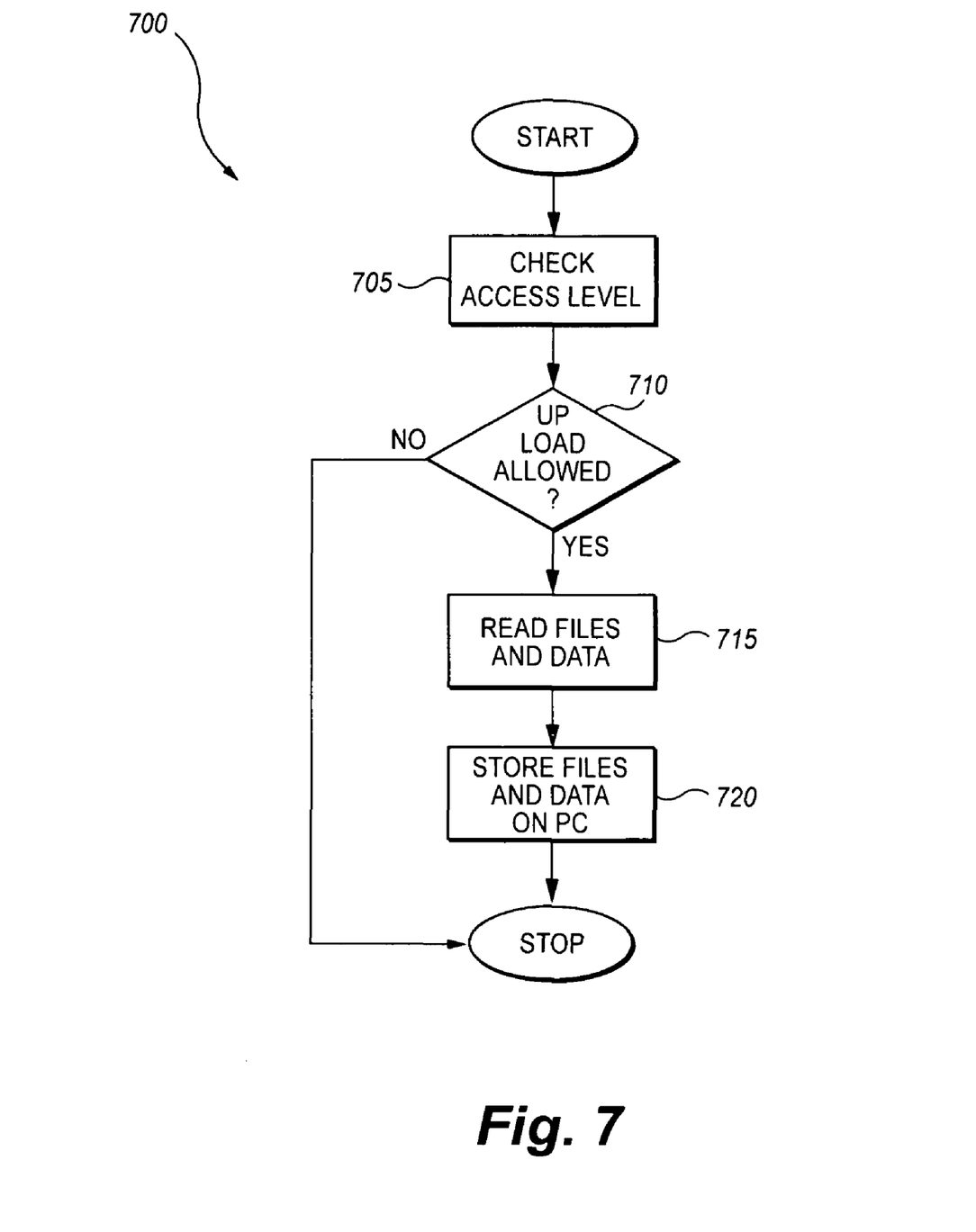
FIG. 7 is a flowchart depicting the process of uploading media files from a media/data card of the present invention onto a personal computer.

When the computer 36 identifies a user request to upload data files from a media/data card 20, process is transferred to block 705 in process 700. At this block the process of FIG. 5, as described above, is called to determine the access level appropriate for the user. Upon returning from process of FIG. 5, control is transferred to block 710, where the access level is evaluated. If the returned access level indicates that the user is not authorized to upload files to the computer 36, the process is terminated without allowing the user to upload the files to the computer 36. If the access level indicates that the user is allowed to upload media data files to the computer 36, control is transferred to block 715.

At block 715, media data files and other information are read from the media/data card 20. The step of reading the data files from the media/data card 20 may comprise reading the file system directory 806 to determine the location of media files in the media storage substructure 808 of the media/data card 20.

The step 715 of reading the data files from the data storage card may comprise decrypting the information stored in the file system directory 806. Reading the files may further comprise decrypting the files stored in media storage substructure 808. The required steps for reading the media files may be correlated with version information stored in the card type identifier substructure 814 of the media/data card, allowing the computer to support diverse implementations of the file system directory 806 and media storage substructure 808. The step 715 of reading the media files from the media/data card 20 may further comprise reading information from the media description area 804 of the media/data card 20.

After the media files are read from the media card, control is transferred to block 720 for storing the files on the computer 36. At block 720 files are written to a non-volatile storage area of the computer 36, such as the computer hard drive. The step 720 of writing the files to the computer may comprise encrypting the files and storing information associated with the file collection and retrieved from the media/data file, such as the descriptive information concerning the media files read from the media description area 804 of the media/data card 20.

After the media data files are stored on the computer at block 720, or if it is determined that the user is not allowed to upload files to the computer 24 at block 710, the process terminates.

In a preferred embodiment, the user may upload media data files to a single personal computer. This limitation may be enforced by including identifying data obtained from the computer 36 as part of the user identification when initializing the media/data card 20. Preferably the files stored on the computer hard drive are stored in an encrypted format so that they cannot be downloaded to other devices using conventional software provided with the computer operating system.

The software installed on playback devices, such as a cell phone 26b, the PDA 26a, or the laptop 26c, may include playback capability but no upload capability. This provides additional security against the unauthorized distribution of media files.

Figure 4:
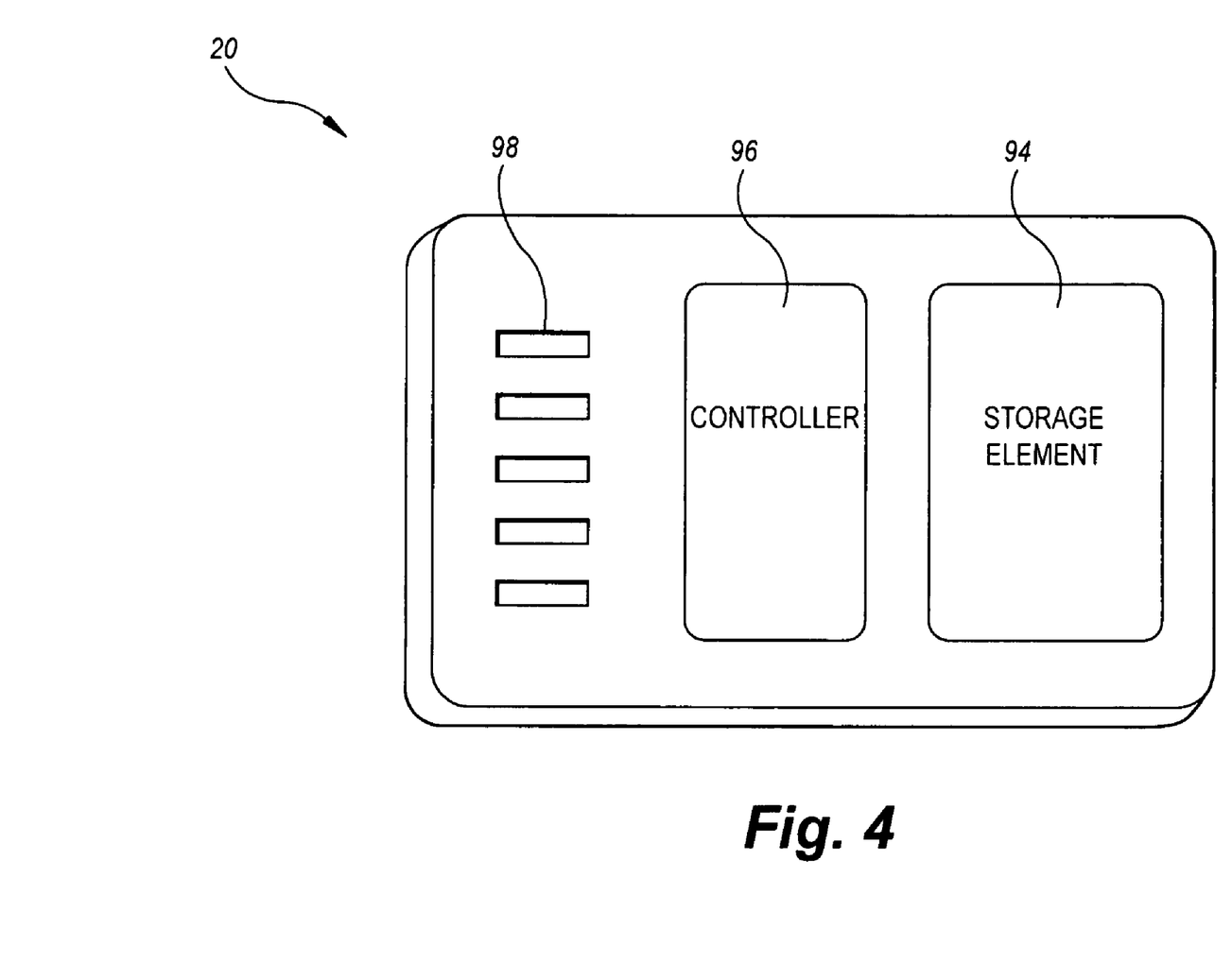
FIG. 4 is a diagrammatic view of a flash memory card embodiment of a media/data card according to the present invention.

FIG. 4 illustrates an embodiment of a digital media storage card 20. The digital media storage card 20 provides non-volatile storage for holding digital media files. The digital media storage card 20 includes a storage element 94, which provides the means for storing digital information, and a contact area 96 for interfacing between the memory card and external devices for writing and reading data to the storage card. The digital media storage card may also contain a controller element 98. When provided, the controller element 98 presents a standard interface to external devices for communicating with the digital memory card.

In a preferred embodiment of the invention, the storage element 94 of the digital media storage card 20 comprises flash memory. For example, the digital storage media card 20 may be a memory stick (MS) device, for example, Secure Digital (SD), micro-Secure Digital (mSD), Multi-Media Card, (MMC), or a ProDuo Card. The system could also be stored by default in any storage memory device that processes and executes from flash memory devices. The controller 98 of the memory stick provides a serial interface through which data is read from, or written to, the flash memory. As another example, the storage card may be a compact flash (CF) memory card. The controller on a CF compatible memory card may provide an ATA interface compatible with the interface found on hard drives.

The storage element is not limited to flash memory. The selected storage device must be able to store sufficiently large amounts of data within a physical form factor that is convenient consumers. In one embodiment, the storage element 94 may be a magnetic disk or hard drive. Small hard drives are currently available providing several gigabytes of storage within a credit card sized form factor. For example, IBM's MagicStor 2.2 GB Microdrive is a hard drive based storage device that provides an interface compatible with CF flash memory devices.

Preferably, the media/data card 20 is a small, compact device. A typical flash memory based media/data card 20 is wallet-sized, the size of a typical credit card, or even smaller. It will be understood, however, that the card can be of any convenient or desirable size.

The media/data cards may be versions of DVD or CD discs that may be written to. For example a media/data card may comprise a DVD-RW, DVD+RW, or CD-RW technology disk of a convenient size or shape.

The adapter module 22 provides an interface between the digital memory storage device and the computer. The adapter module 22 provides one or more slots. Each provided slot provides a physical and communicative interface between the adapter 22 and the digital medium storage card 20. The adapter 22 communicates with the card 20 using the interface provided by the card's controller 98, and communicates with the personal computer 36 using an interface compatible with the personal computer 36.

The interface between the computer 36 and the adapter 22 may be compatible with a Universal Serial Bus (USB). Alternatively, the interface between the computer 36 and the adapter 22 is compatible with IEEE 1394.

The digital memory storage card 20 may be provided with a controller 98 that directly provides a USB, IEEE 1394 or other personal computer compatible interface. In that case the adapter module 22 is not necessary, and the memory card 20 is directly connected to the port of the personal computer 36.

Suitable adapters for use with the invention are commercially available. For example, the Universal Silicon SP8-R2 memory card reader can accommodate a variety of flash memory cards, including Compact Flash (CF), Memory Stick (MS) technology cards, as well as micro drive (miniature hard drive) based cards.

The interface between the adapter 22 and the personal computer 36 is not limited to wired connections. The personal computer 36 and the adapter 22 may be equipped to communicate over a wireless connection implementing a Wireless Application Protocol (WAP), such as Bluetooth.

One skilled in the art would understand that the specialized software provided on the computer 36 may perform additional functions. For example, the software can organize uploaded collections of media files and provide a graphical user interface displaying the collections and descriptive information concerning the collections. The graphical user interface would allow the user to select collections using the mouse and keyboard, and to initiate activities, such as playing files form the stored collections and displaying the contents of media/data cards 20 connected to the computer 36 via the adapter 22 and initiating uploads of media data collections to the computer 36.

It is understood that the processes and methods described are performed by a processor executing instruction stored in the memory of a computer. Alternatively, the process steps may be implemented in hardware adapted to carry out the described process or method steps, or by a combination of hardware and software carrying out steps of the described methods.

The computer may be a general-purpose computer provided with a computer program that, when executed and loaded into the memory of the general-purpose computer, causes the general-purpose computer to carry out the described methods. Alternatively, a specific use computer containing specialized hardware for carrying out one or more of the methods or one or more steps of a method could be utilized.

It is envisioned that the media/data card may be provided with a particular collection of multimedia files stored in read only memory by authorization of the copyright holder(s), or may be provided with read-write memory for downloading of multimedia files from a network or other memory source authorized by the copyright holder(s).

Figure 10:
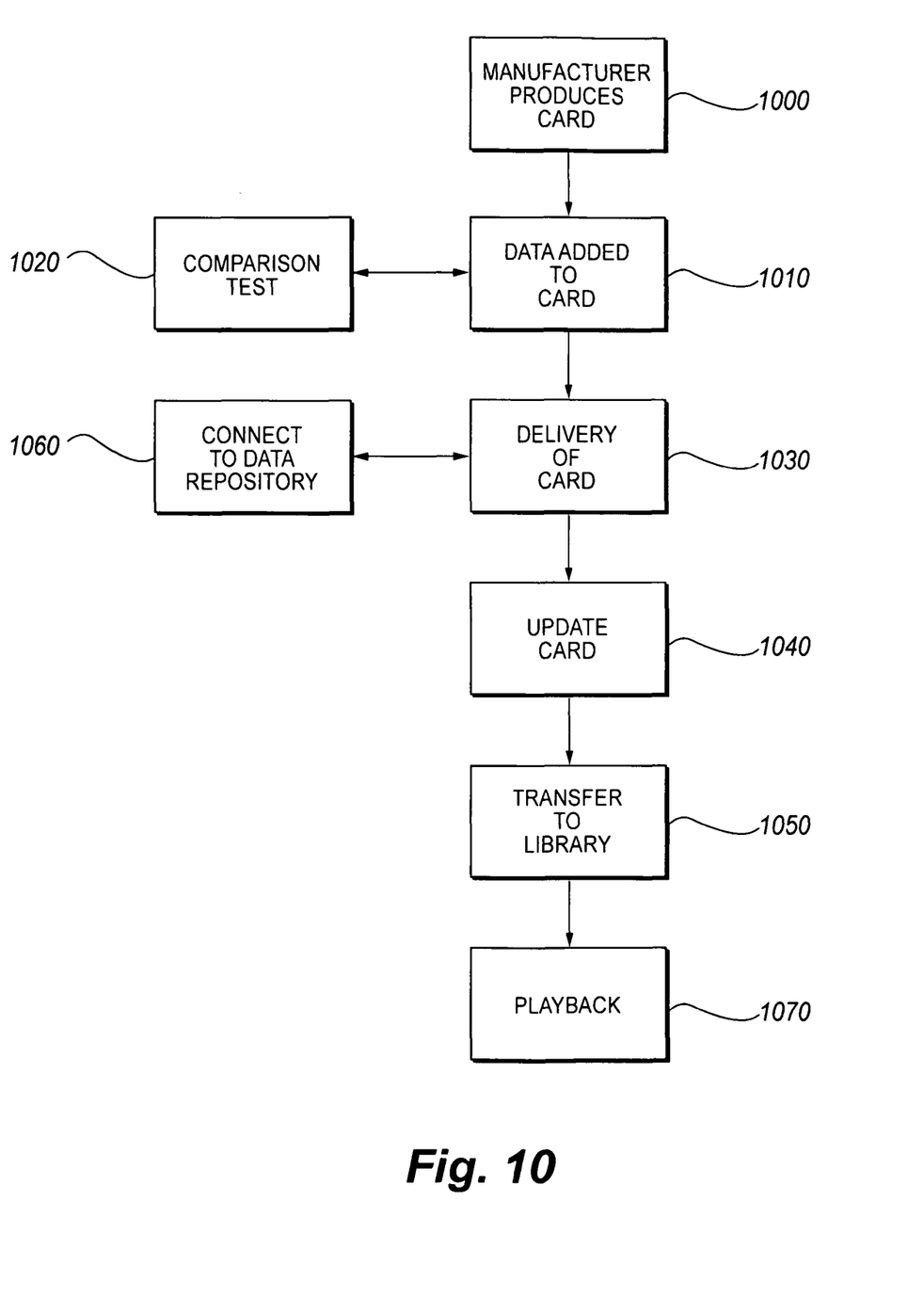
FIG. 10 is a flowchart illustrating a method of delivering and using the media/data card according to the present invention.

FIG. 10 illustrates a manufacturing, delivery and usage method for media/data cards 20. At step 1000, the media/data card 20 is produced by the manufacturer. At this step, the actual hardware, described above, of the media/data card 20 or other storage medium is produced. Once the hardware and/or associated circuitry of card 20 have been produced, the software stored on card 20 may be added (such as the systems illustrated in FIGS. 8 and 9). It is at this stage that the identification information, such as serial number or digital signature, described in detail above, are added to the card 20.

At step 1010, the digital data in the form of media files, for example, are added to card 20. The data collection may be a music album or a pre-selected list of audio or video tracks, for example, selected by the user remotely, such as through communication through the Internet. Each media track is passed through a digital rights management processor, which tags each song with desired information, such as a serial number, digital tracking information, and additional information relevant to the particular tracks.

The manufacturer may run a test of the data at step 1020, comparing against a data set known to be accurate and have desired integrity. Any desired suitable test of the data recorded on card 20 may be performed by the manufacturer.

Following testing and approval of the data stored on card 20, the card 20 is prepared for delivery at step 1030. The card 20 may be delivered to a retail outlet where consumers purchase the digital media. The consumers may also purchase any associated hardware or computer peripherals associated with the media and playback of the digital data.

Alternatively, kiosks or similar physical delivery sites may be set up in public locations, such as shopping malls. Rather than delivering the media cards to a retail outlet, such as a music store, consumers may utilize the kiosks to receive the selected digital media on cards 20. Each kiosk includes a computer system, as described above, along with a dispenser for cards 20, and read/write interfaces, as described above, for updating information on a pre-existing card 20 (to be described below with reference to step 1040). Each kiosk is in communication, via the Internet or the like, with a data repository associated with the manufacturer or an authorized supplier of the desired digital data (as will be described below with relation to step 1050).

As a further alternative, the card 20 may be manufactured as described above, but delivered directly to the consumer through postal mail or the like, rather than being delivered to a retail outlet. Further, as described above, the user may purchase data from a data repository via connection through the Internet or the like for storage on a pre-existing card 20.

Once the consumer has received the media card 20, the user may update the data on the card 20 (step 1040). Through interconnection with the Internet or the like via the computer systems and interfaces described above, the user may connect with a data repository (step 1060), which may be a remote database or the like containing a wide variety of digital media available to be purchased by the consumer. Preferably, the software running on the user's computer system (or the kiosk)

includes encryption and authorization coding, as described in detail above, allowing the user to purchase media only from an authorized seller of such digital data.

The user may select a "playlist" of one or more desired media files from the data repository and, following purchase, download the media files to the computer desktop application. It should be understood that the kiosk described above includes similar hardware and software to the user's personal computer system, as described above.

The user may have a library including multiple playlists on the user's computer or on the card 20 itself, and the user may transfer the newly updated/downloaded playlist to the data library (step 1050). It should be understood that the playlists and the user's data library are encrypted, as described above, so that they may be played and stored only on authorized cards 20 and associated media players, such as those described above.

Following purchase and/or additional updating, the user may then take the card 20 or other suitable storage medium and connect it to an associated playback device for playback of the digital media stored thereon (step 1070).

It is to be understood that the present invention is not limited to the embodiments described above, but encompasses any and all embodiments within the scope of the following claims.

We claim:

1. A method for providing secure access to digital media files stored on a computer readable digital medium thereby permitting playback of the media files on diverse end devices and providing security against copying, comprising the steps of:
   reading a security data structure stored on the computer readable digital medium;
   retrieving a user identifier associated with a user requesting access to the media files;
   comparing information read from the security data structure with the user identifier;
   determining an access level for the user based on the comparison;
   determining whether an access requested by the user is authorized based upon the access level determined for the user;
   forming a digital signature based upon the user identifier and identification data stored on the computer readable digital medium using a cryptographically secure hashing function; and
   storing the digital signature in the security data structure stored on the computer readable digital medium;
   wherein the computer readable digital medium includes a media player library containing a plurality of software modules for selectively accessing a respective one of a plurality of separate and distinct media players and file types, the software modules defining a cross-platform language, the media player library including an intermediate filter driver for:
   i) leveraging an internal codec of a file type associated with each of the multimedia files and streaming the file type to the end device without the need to perform a file conversion function in order to read or play back the digital content;
   ii) recognizing the type of digital media and the type of the end device and implementing the device's initialization system that manages the playback of all digital media files; and
   iii) accessing the files and determining levels authorized by copyright holders of the multimedia files according to the user identifier.

2. The method for providing secure access as recited in claim 1, wherein said step of comparing information read from the security area with the user identifier comprises the steps of:
   determining whether the security data structure contains a previously written user identifier; and
   determining whether the previously written user identifier matches the user identifier of the user requesting access when the security data structure contains the previously written user identifier.

3. The method for providing secure access as recited in claim 2, further comprising the step of writing the user identifier of the user requesting access to the security data structure when the security data structure does not contain a previously written user identifier.

4. A media/data card that provides for the storage and distribution of collections of digital media files on a universal digital storage device thereby permitting playback of the media files on diverse end devices and providing security against copying, comprising:
   a card having a computer readable digital medium disposed thereon;
   an area of memory disposed in the computer readable digital medium dimensioned and configured for storing a plurality of multimedia files thereon;
   a data structure disposed in the computer readable digital medium having a plurality of substructures, including:
   substructures for storing data relating to identification of the multimedia files and file types;
   a user identifier;
   a file system directory, at least a portion of the file system directory being encrypted;
   a media player library containing a plurality of software modules for selectively accessing a respective one of a plurality of separate and distinct media players and file types, the software modules defining a cross-platform language, the media player library including an intermediate filter driver for:
   i) leveraging an internal codec of a file type associated with each of the multimedia files and streaming the file type to the end device without the need to perform a file conversion function in order to read or play back the digital content;
   ii) recognizing the type of digital media and the type of the end device and implementing the device's initialization system that manages the playback of all digital media files; and
   iii) accessing the files and determining levels authorized by copyright holders of the multimedia files according to the user identifier;
   means for universally connecting the card to ports of portable computing devices for playback of the multimedia files stored on the computer readable digital medium; and
   means for reading the multimedia files stored on the computer readable digital medium.

5. The media/data card as recited in claim 4, wherein said substructures include a security data substructure, the user identifier and file access levels being stored in the security data substructure.

6. The media/data storage card as recited in claim 5, further comprising means for retrieving the user identifier associated with the user requesting access to the data files.

7. The media/data storage and playback system as recited in claim 6, further comprising means for comparing information read from the security data substructure with the user identifier.

8. The media/data storage and playback system as recited in claim 7, further comprising means for determining an access level for the user based upon the comparison of the information read from the security data structure with the user identifier.

9. A method for writing a collection of media data files to a computer readable digital medium thereby permitting playback of the media files on diverse end devices and providing security against copying, comprising the steps of:

identifying at least one data file to form a collection;

retrieving the at least one data file;

writing the at least one data file to a media storage substructure of the computer readable digital medium;

writing locations associated with the at least one data file to a file system directory substructure on the computer readable digital medium;

writing a user identifier into a security substructure on the computer readable digital medium, the security substructure precluding subsequent access to the media storage substructure when the user identifier is not furnished;

forming a digital signature based upon the user identifier and identification data stored on the computer readable digital medium using a cryptographically secure hashing function; and storing the digital signature in the security data structure stored on the computer readable digital medium;

wherein the computer readable digital medium includes a media player library containing a plurality of software modules for selectively accessing a respective one of a plurality of separate and distinct end devices and file types, the software modules defining a cross-platform language, the media player library including an intermediate filter driver for:

i) leveraging an internal codec of a file type associated with each of the multimedia files and streaming the file type to the end device without the need to perform a file conversion function in order to read or play back the digital content;

ii) recognizing the type of digital media and the type of the end device and implementing the device's initialization system that manages the playback of all digital media files; and iii) accessing the files and determining levels authorized by copyright holders of the multimedia files according to the user identifier.

10. The method for writing a collection of data files to a computer readable digital medium as recited in claim 9, further comprising the step of encrypting the locations before writing the locations to the file system directory substructure.

11. The method for writing a collection of data files to a computer readable digital medium as recited in claim 9, wherein said step of writing the at least one data file includes encrypting the at least one data file.

12. The method for writing a collection of data files to a computer readable digital medium as recited in claim 9, further comprising the step of writing playback software on the computer readable medium, the playback software having means for playing back the data files on any portable computing device.

13. The method for writing a collection of data files to a computer readable digital medium as recited in claim 9, further comprising the steps of:

selectively concatenating a plurality of the data files into a single concatenated data file; and writing the single concatenated data file to the media storage substructure of the computer readable digital medium.

* * * * *